(12) United States Patent
Hwang et al.

(10) Patent No.: US 10,191,232 B2
(45) Date of Patent: Jan. 29, 2019

(54) OPTICAL MODULE

(71) Applicant: OE SOLUTIONS CO., LTD., Gwangju (KR)

(72) Inventors: Mi Hee Hwang, Gwangju (KR); Hyun Chang Shin, Gwangju (KR); Eun Kyo Jung, Seoul (KR)

(73) Assignee: OE SOLUTIONS CO., LTD., Gwangju (KR)

( * ) Notice: Subject to any disclaimer, the term of this patent is extended or adjusted under 35 U.S.C. 154(b) by 0 days.

(21) Appl. No.: 15/635,227

(22) Filed: Jun. 28, 2017

(65) Prior Publication Data
US 2017/0371112 A1    Dec. 28, 2017

(30) Foreign Application Priority Data
Jun. 28, 2016  (KR) .................. 10-2016-0081143

(51) Int. Cl.
H04B 10/40 (2013.01)
G02B 6/42 (2006.01)
G02B 6/32 (2006.01)
H04B 10/50 (2013.01)
H04B 10/60 (2013.01)
G02B 6/00 (2006.01)

(52) U.S. Cl.
CPC ............. G02B 6/4215 (2013.01); G02B 6/00 (2013.01); G02B 6/32 (2013.01); G02B 6/421 (2013.01); G02B 6/4208 (2013.01); G02B 6/4214 (2013.01); G02B 6/4246 (2013.01); H04B 10/40 (2013.01); H04B 10/50 (2013.01); H04B 10/60 (2013.01)

(58) Field of Classification Search
CPC .............................. H04B 10/40; H04B 10/43
USPC .................................. 398/135–139
See application file for complete search history.

(56) References Cited

U.S. PATENT DOCUMENTS

| | | | | |
|---|---|---|---|---|
| 4,767,171 A * | 8/1988 | Keil | ...... | G02B 6/4246 385/35 |
| 6,075,635 A * | 6/2000 | Butrie | ...... | G02B 6/4207 385/24 |
| 6,172,777 B1 * | 1/2001 | Flood | ...... | G11C 13/042 359/10 |
| 6,334,716 B1 * | 1/2002 | Ojima | ...... | G02B 6/4246 385/88 |
| 7,369,776 B2 * | 5/2008 | Masahiko | ...... | H04B 10/40 398/135 |
| 7,413,355 B2 * | 8/2008 | Nishizawa | ...... | G02B 6/4246 385/93 |

(Continued)

Primary Examiner — Li Liu
(74) Attorney, Agent, or Firm — Ichthus International Law PLLC

(57) ABSTRACT

Disclosed is an optical module including an optical transmitter which is configured to output a first optical signal, an optical receiver which is configured to receive a second optical signal, a holder which is configured to include an optical fiber on which the first optical signal is incident and from which the second optical signal is emitted. The optical module further includes a first optical filter disposed between the optical transmitter and the holder to transmit the first optical signal and reflect the second optical signal, a first parallel light lens disposed between the first optical filter and the optical transmitter, and a second parallel light lens disposed between the first optical filter and the holder.

12 Claims, 9 Drawing Sheets

(56) References Cited

U.S. PATENT DOCUMENTS

| | | | | |
|---|---|---|---|---|
| 8,277,132 B2* | 10/2012 | Lee | ................. | G02B 6/4271 |
| | | | | 385/88 |
| 9,541,714 B2* | 1/2017 | Lim | ................. | G02B 6/42 |
| 9,596,032 B2* | 3/2017 | Jung | ................. | H04B 10/40 |
| 2005/0180755 A1* | 8/2005 | Masahiko | ............. | H04B 10/40 |
| | | | | 398/135 |
| 2006/0280411 A1* | 12/2006 | Nishizawa | ........... | G02B 6/4246 |
| | | | | 385/93 |
| 2010/0086310 A1* | 4/2010 | Lee | ................. | H04B 10/40 |
| | | | | 398/138 |
| 2010/0278482 A1* | 11/2010 | Adachi | ............... | G02B 6/4204 |
| | | | | 385/33 |
| 2011/0052125 A1* | 3/2011 | Lee | ................. | G02B 6/4246 |
| | | | | 385/88 |
| 2015/0104199 A1* | 4/2015 | Ye | ................. | G02F 1/0147 |
| | | | | 398/212 |
| 2015/0349889 A1* | 12/2015 | Jung | ................. | H04B 10/40 |
| | | | | 398/139 |
| 2015/0381271 A1* | 12/2015 | Li | ................. | H04B 10/071 |
| | | | | 398/21 |
| 2017/0237228 A1* | 8/2017 | Gudeman | ............ | B81B 7/0067 |
| | | | | 372/26 |

* cited by examiner

OPTICAL MODULE

CROSS-REFERENCE TO RELATED APPLICATION(S)

This application claims priority to Korean patent application No. 10-2016-0081143, filed Jun. 28, 2016, the content of which is incorporated by reference in its entirety.

TECHNICAL FIELD

The present disclosure relates to an optical module used in optical communication, in particular, to a bidirectional optical module for long distance transmission.

BACKGROUND

In general, an optical module refers to different types of optical communication functions and/or devices accommodated in one package and modularized to be connectable to an optical fiber. Nowadays, bidirectional optical modules are mainly used, each formed by modularizing into a single module an optical transmitter using a laser diode light source with low power consumption and utilizable over long distance and an optical receiver which performs optical communication using a photo diode.

A bidirectional optical module includes an optical transmitter, an optical receiver, an optical filter, an optical fiber, and a holder for accommodating the optical fiber, etc. A transmission signal output from the optical transmitter passes through the optical filter and is incident on the optical fiber, and a reception signal output from the optical fiber is reflected by the optical filter and incident on the optical receiver.

The optical filter generally is tilted at 45 degrees and divides the transmission signal and the reception signal. However, when wavelength separation between the transmission and reception signals is several nanometer (nm) wide, it is difficult to separate the wavelengths using a difference between transmittance properties of S-polarized light and P-polarized light to have the optical isolation of the transmission and reception wavelengths (a difference between transmittance properties of the transmission signal and the reception signal) reach about 25 dB.

Accordingly, in a bidirectional optical module with separation between transmission and reception wavelengths of several nm, a beam splitter which distributes light power is used, not a wavelength division multiplexing (WDM) filter capable of dividing a wavelength. However, since the beam splitter transmits about 50% of incident light and reflects the other 50% of the incident light, many problems occur including problems described below.

First, to perform long distance transmission using a bidirectional optical module, high light coupling efficiency is necessary when an output from a laser diode is focused on an optical fiber. However, when a beam splitter is used, since 50% transmission and 50% reflection generate a filter loss of 3 dB, it is impossible to obtain an adequate light coupling efficiency of a laser diode.

Second, to perform the long distance transmission using the bidirectional optical module, in addition to the high light coupling efficiency of the laser diode, also the high reception sensitivity of a photo diode is necessary. However, it is impossible to obtain a high reception sensitivity due to the filter loss of 3 dB because of light output from an optical fiber being reflected by a filter to become incident on the photo diode.

Lastly, since adequate light isolation of transmission and reception signals is not provided in a bidirectional optical module with a wavelength separation of several nm, the transmission signal may have an effect on the reception signal and thereby deteriorate communication quality, e.g., optical crosstalk. Thus, there is a need for further improved technology relating to the long distance transmission using a bidirectional optical module.

SUMMARY

The present disclosure discloses exemplary embodiments of an optical module capable of separating a signal even when a wavelength band of a transmission signal and a reception signal is narrow.

In an aspect of the present disclosure, an embodiment of an optical module with an increased light coupling efficiency between a transmission signal and an optical fiber is provided. In one implementation, the embodiment provides an optical module with an increased reception sensitivity of a photo diode. In another implementation, the embodiment provides an optical module with an improved optical crosstalk characteristic.

Aspects of the present disclosure are not limited thereto and additional aspects of the present disclosure will be obvious to one of ordinary skill in the art from the following description.

In an aspect of the present disclosure, there is provided an optical module including an optical transmitter which outputs a first optical signal, an optical receiver which receives a second optical signal, a holder which includes an optical fiber on which the first optical signal is incident and from which the second optical signal is emitted, a first optical filter disposed between the optical transmitter and the holder to transmit the first optical signal and reflect the second optical signal, a first parallel light lens disposed between the first optical filter and the optical transmitter, and a second parallel light lens disposed between the first optical filter and the holder.

In an aspect, the optical module may include an isolator disposed between the first parallel light lens and the optical transmitter.

In an aspect, the optical transmitter may include a light source and a first focus lens which is configured to focus a first optical signal emitted from the light source.

In an aspect, the first optical signal emitted from the light source may be converged by the first focus lens and a spot at which the first optical signal is converged may be between the first parallel light lens and the isolator.

In an aspect, the first parallel light lens may convert the first optical signal into parallel light, and the second parallel light lens may focus the first optical signal converted into the parallel light.

In an aspect, the second parallel light lens may convert the second optical signal into parallel light.

In an aspect, the optical module may include a reflector which reflects the second optical signal reflected by the first optical filter toward the optical receiver.

In an aspect, the optical module may include a second optical filter disposed between the reflector and the optical receiver.

In an aspect, the second optical signal converted into the parallel light may be reflected by the first optical filter and the reflector, and the second optical signal reflected by the reflector may pass through the second optical filter and may be incident on the optical receiver.

In an aspect, the optical module may include a case into which the optical transmitter, the optical receiver, and the holder are inserted and in which the first optical filter, the first parallel light lens, and the second parallel light lens are disposed.

In an aspect, the optical module may include an isolator disposed between the first parallel light lens and the optical transmitter, a reflector which reflects the second optical signal reflected by the first optical filter toward the optical receiver, and a second optical filter disposed between the reflector and the optical receiver.

In an aspect, the optical module may include a supporting block which is coupled with the case and accommodates the first parallel light lens, the first optical filter, the isolator, the reflector, and the second optical filter.

In an aspect, the holder may accommodate the second parallel light lens.

In an aspect, the holder may accommodate the first parallel light lens, the second parallel light lens, the first optical filter, the reflector, and the second optical filter.

In an aspect, the optical module may include an adjustment member which fixes the optical transmitter to the case. Here, the adjustment member may include a first adjustment member coupled with the case and a second adjustment member inserted into the first adjustment member and coupled with the optical transmitter.

In an aspect, the isolator may be disposed inside the second adjustment member.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
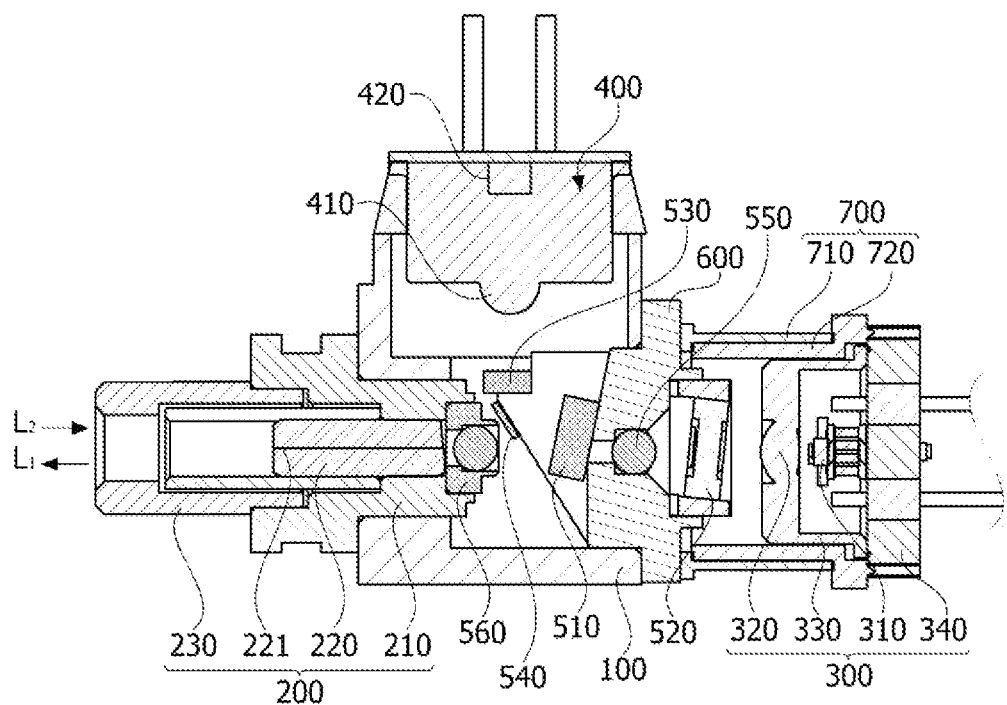
FIG. 1 is a view conceptually illustrating an optical module according to an aspect of the present disclosure.

Since the present disclosure may have various modifications and many embodiments, exemplary embodiments are shown in the drawings and will be described in detail.

The embodiments disclosed herein are not to be taken to limit the scope of the present disclosure to specific embodiments, but should be construed to include modifications, equivalents, or substituents within the spirit and technical scope of the present disclosure.

Also, it should be understood that the terms used herein are only to describe the exemplary embodiments, not to limit the present disclosure. As such, singular expressions, unless contextually otherwise defined, include plural expressions.

In the present disclosure, the term "comprise," "comprising," "including," "include," "have," or "having" is used to designate features, numbers, steps, operations, elements, components or combinations thereof disclosed in the specification as being present and does not preclude possibility of the existence or the addition of one or more other features, numbers, steps, operations, elements, components, or combinations thereof.

Also, it will be understood that the attached drawings are enlarged or reduced for convenience of description in the present disclosure.

The embodiments of the present disclosure will be described with reference to the drawings. Throughout the specification, like reference numerals designate like elements and repetitive descriptions will be omitted.

FIG. 1 is a concept view of an optical module according to an aspect of the present disclosure.

Referring to FIG. 1, a bidirectional optical transceiver module includes a holder 210 in which an optical fiber 221 is inserted, an optical transmitter 300 which outputs a first optical signal L1 to the optical fiber 221, an optical receiver 400 which receives a second optical signal L2, a first optical filter 510 which transmits the first optical signal L1 and reflects the second optical signal L2, and a reflector 540 which reflects the second optical signal L2 reflected by the first optical filter 510 toward the optical receiver 400.

The bidirectional optical transceiver includes a case 100. The case 100 may include a plurality of accommodating portions in which the optical fiber 221, the optical transmitter 300, and the optical receiver 400 are inserted. The optical fiber 221 and the optical transmitter 300 may be disposed to face each other in the case 100, and the optical receiver 400 may be disposed perpendicularly to a direction in which the optical fiber 221 is inserted. Further, in one implementation, not limited thereto, the optical transmitter 300 may be disposed perpendicularly to the direction in which the optical fiber 221 is inserted.

In the example shown in FIG. 1, the optical fiber 221 is disposed on one side of the case 100. A stub 220 in which the optical fiber 221 is accommodated may be inserted into the holder 210. Also, a connector 230 for connecting an external optical channel may be coupled with the holder 210. It is noted that a structure described above may be a receptacle type, but the structure of the holder 210 is not particularly limited thereto.

In the example, the optical fiber 221 may transmit the first optical signal L1 output from the optical transmitter 300 outward or may output the second optical signal L2 that is received from the outside toward the first optical filter 510.

Further, the optical transmitter 300 may be configured to transmit the first optical signal L1 outward through the optical fiber 221. The first optical signal L1 may have a wavelength different from a wavelength of the second optical signal L2 that is output from the optical fiber 221. The optical transmitter 300 may include a light source 310, a header 340, and a first focus lens 320. In one implementation, the optical transmitter 300 having a structure described above may have a TO-CAN structure.

The light source 310 may be formed of a semiconductor light emitting device (LED) and may convert an electric signal into an optical signal to output. A laser diode may be used as the light source 310. Since the laser diode may emit tightly focusable light with high energy, have small power consumption and a narrow spectral width, the laser diode may be appropriate as a light source for optical communication.

The header 340 on which the light source 310 is mounted may be formed in a circular disk shape through which a plurality of connection pins pass. The connection pins form an electrical path between the light source 310 and an external circuit board (not shown).

The first focus lens 320 may focus the first optical signal L1 output from the light source 310. The first focus lens 320 may be disposed at a position appropriate for transmitting the first optical signal L1 toward the optical fiber 221.

The bidirectional optical transceiver of FIG. 1 further includes a distance adjustment member 700. The distance adjustment member 700 may include a first adjustment member 710 disposed on the other side of the case 100 and a second adjustment member 720 fixedly inserted in the first adjustment member 710. A distance for the second optical signal L2 emitted from the optical transmitter 300 to travel to reach the optical fiber 221 may be adjusted depending on insertion depths of the second adjustment member 720 and the first adjustment member 710. Accordingly, the optical coupling efficiency of the optical transmitter 300 may be adjusted according to different insertion depths of the second adjustment member 720 and the first adjustment member 710. The optical transmitter 300 may be fixedly inserted into one side of the second adjustment member 720.

The optical receiver 400 is configured to convert the second optical signal L2 that is received from the outside through the optical fiber 221 into an electric signal. The optical receiver 400 may include a photo diode. When an optical signal is incident on the photo diode, a reverse current proportional to an amount of incident light flows. That is, the optical receiver 400 may convert an optical signal into an electric signal by changing an output current according to an amount of incident light.

The first optical filter 510 may be a wavelength division multiplexing (WDM) filter and may be disposed between the optical transmitter 300 and the optical fiber 221. The first optical filter 510 may be designed to allow only optical signals with a particular wavelength to pass. For example, the first optical filter 510 may allow the first optical signal L1 that is output from the optical transmitter 300 to pass and reflect the second optical signal L2 that is output from the optical fiber 221. In one implementation, to divide the optical signals even when a separation amount between the wavelengths of the first optical signal L1 and the second optical signal L2 is small, the first optical filter 510 may be mounted on the supporting block 600 with an inclination angle smaller than about 20 degrees.

The reflector 540 may be mounted on the supporting block 600 and may turn a path of the first optical signal L1 reflected by the first optical filter 510 toward the optical receiver 400. The reflector 540 may be manufactured by attaching a separate reflecting member to the supporting block 600, but is not limited hereto, and a reflecting area may also be directly formed on an inclined plane of the supporting block 600.

Further, a second optical filter 530 shown in FIG. 1 may be a blocking filter (or a 0-degree filter) and be configured to allow the second optical signal L2 reflected by the first optical filter 510 and the reflector 540 to pass. The second optical signal L2 which passes through the second optical filter 530 is transmitted to a light receiving element 420 of the optical receiver 400 and is converted into an electrical signal by the optical receiver 400.

The isolator 520 may remove reflection noise by preventing the first optical signal L1 and/or the second optical signal L2 from being reflected by the inside of the case 100 and then being incident on the optical transmitter 300 again.

The isolator 520 may include a polarizer which allows only an optical signal of a preset polarization component to pass and a Faraday rotator which rotates a linear polarization of an optical signal input therein.

Figure 2:
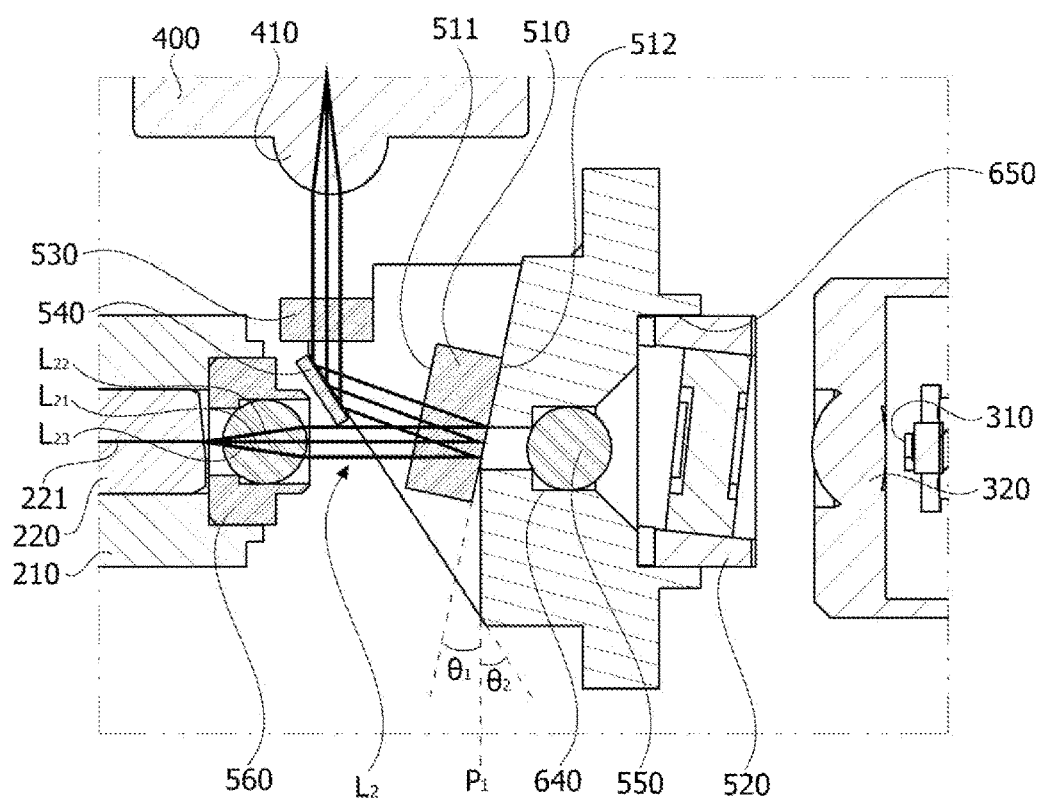
FIG. 2 is a view illustrating a movement path of a second optical signal output from an optical fiber in an aspect of the present disclosure.
Figure 3:
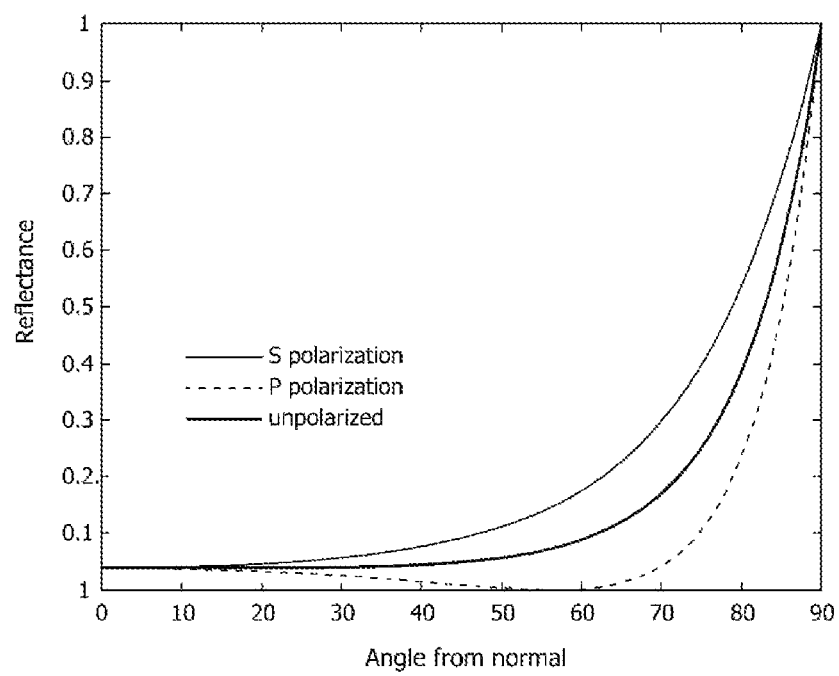
FIG. 3 is a graph illustrating reflectance curves of S wave and P wave depending on an incidence angle in an aspect of the present disclosure.
Figure 4:
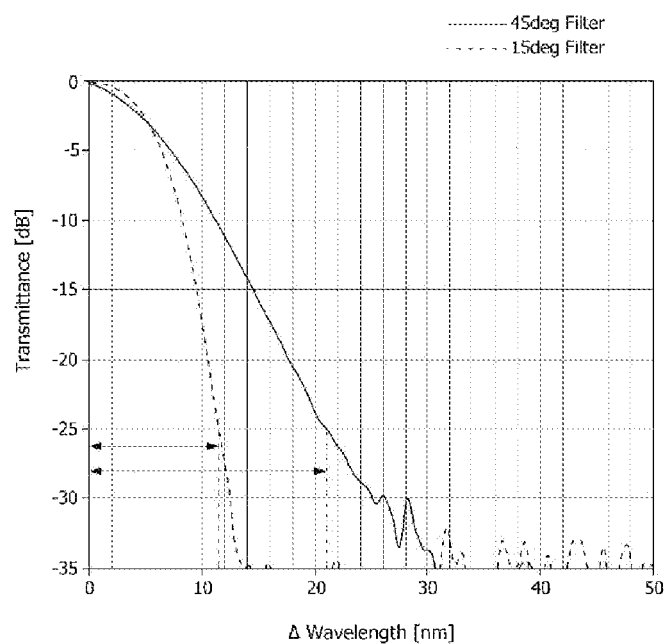
FIG. 4 is a graph illustrating transmittance curves of a 45-degree filter and a 15-degree filter in an aspect of the present disclosure.
Figure 5:
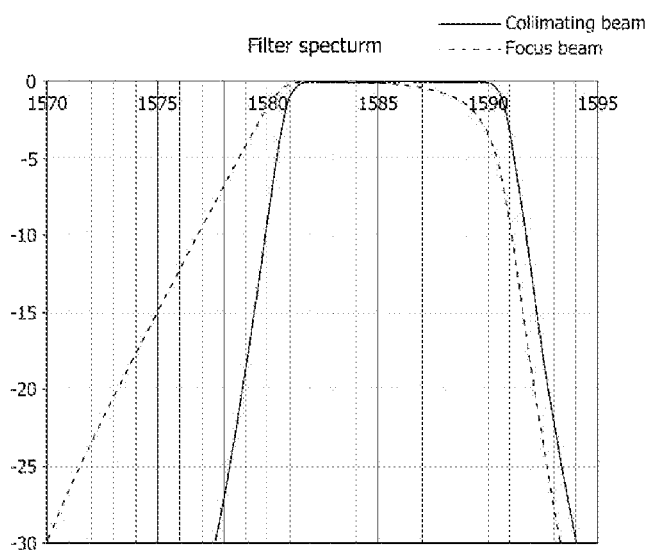
FIG. 5 is a graph illustrating transmittance properties with respect to parallel light and convergent light incident on a first optical filter in an aspect of the present disclosure.

FIG. 2 is a view illustrating a movement path of a second optical signal output from an optical fiber. FIG. 3 is a graph illustrating reflectance curves of S wave and P wave depending on an amount of an incidence angle. FIG. 4 is a graph illustrating transmittance curves of a 45-degree filter and a 15-degree filter. FIG. 5 is a graph illustrating transmittance properties of parallel light and convergent light incident on a first optical filter.

Referring to FIG. 2, the second optical signal L2 emitted from the optical fiber 221 may include main light L21 and emitted light L22 and L23. The main light L21 may be defined as light which propagates from the optical fiber 221 to the first optical filter 510 along a main path (an optical axis), and the emitted light L22 and L23 may be defined as light which propagates at certain angles with the main path.

A second parallel light lens 560 may convert the second optical signal L2 emitted from the optical fiber 221 into becoming parallel light. Since the emitted light L22 and L23 of the second optical signal L2 is converted into parallel light, a beam width of the second optical signal L2 may become smaller compared with a case of not being converted into the parallel light. For this, the second parallel light lens 560 and the optical fiber 221 may be disposed to be adjacent to each other. In one implementation, the beam width of the second optical signal L2 converted into the parallel light may be from about 100 um to 200 um, but is not limited thereto.

The second optical signal L2 that is converted into the parallel light is incident on an incident surface 511 of the first optical filter 510. In an aspect, the first optical filter 510 may be at a first angle θ1 from about 8 degrees to 18 degrees with a perpendicular P1. For example, an angle of the first optical filter 510 may be about 12 degrees.

In an aspect of the present disclosure, when the first angle $\theta_1$ is less than 8 degrees, a reflection angle becomes smaller in such a way that the reflected second optical signal L2 is incident on the optical fiber 221 again or a loss caused by interference occurs to decrease receiving sensitivity.

Also, in another aspect of the present disclosure, when the first angle $\theta_1$ is more than 18 degrees, transmittance and reflection curves of an optical filter are distorted, and properties of the optical filter are degraded due to a difference in filter reflectance according to polarization.

Referring to FIG. 3, it can be seen that the reflectance difference between S-polarized light and P-polarized light increases when an incidence angle of the second optical signal L2 incident on the first optical filter 510 is more than about 18 degrees.

Accordingly, in an aspect of the present disclosure, when the first angle is adjusted to be from about 8 degrees to 18 degrees, it is possible to effectively separate an optical signal by reducing a difference in reflectance according to a polarization direction even when wavelength bandwidths of the first optical signal L1 and the second optical signal L2 are small.

FIG. 4 shows that a 45-degree filter needs wavelength separation of 21 nm but a 15-degree filter performs adequately with separation of only 11 nm to obtain an isolation of 25 dB. However, referring to FIG. 5, when light incident on the first optical filter 510 is convergent light incident at a certain angle, since a transmittance property inclination is gradually formed between a transmittance area and a reflection area, it is impossible to provide adequate light isolation. That is, when wavelength separation of a first optical signal and a second optical signal is several nm or more, even though a filter angle is adjusted from 8 degrees and 18 degrees, it may be impossible to provide adequate light isolation when the incident light is the convergent light.

According to the example described herein, since the light to be incident on the first optical filter 510 is converted into parallel light and then is incident on the first optical filter 510, transmittance band properties may be relatively uniform. For example, when wavelength separation between a transmission signal and a reception signal is about 6.0 nm, adequate light isolation (of about 20 dB) may be provided.

Referring back to FIG. 2 again, the reflector 540 may be disposed at an angle $\theta_2$ of from about 26 degrees to 35 degrees with the perpendicular P1. When conditions described above are satisfied, the second optical signal L2 incident on the first optical filter 510 may be reflected toward the optical transmitter 300.

Since most of the second optical signal L2 reflected by the reflector 540 and incident on the second optical filter 530 is parallel light, the second optical signal L2 is not reflected by the second optical filter 530. Accordingly, since the second optical signal L2 is perpendicularly incident, a loss of light does not occur.

The second optical signal L2 which passes through the second optical filter 530 may be focused by a second focus lens 410 and may be incident on a light-receiving element. As described above, since a beam width of the second optical signal L2 is small at about 100 um to 200 um, parallel light lens is not used and an optical receiver (for example, PIN-TIA, APD, etc.) including a general focusing lens may be used. Accordingly, cost for components may be reduced.

In the example, since the second optical signal L2 is converted into the parallel light and incident on the first optical filter 510, a filter loss becomes small, and most of the light may be transmitted to the optical receiver, thereby increasing reception sensitivity.

Figure 6:
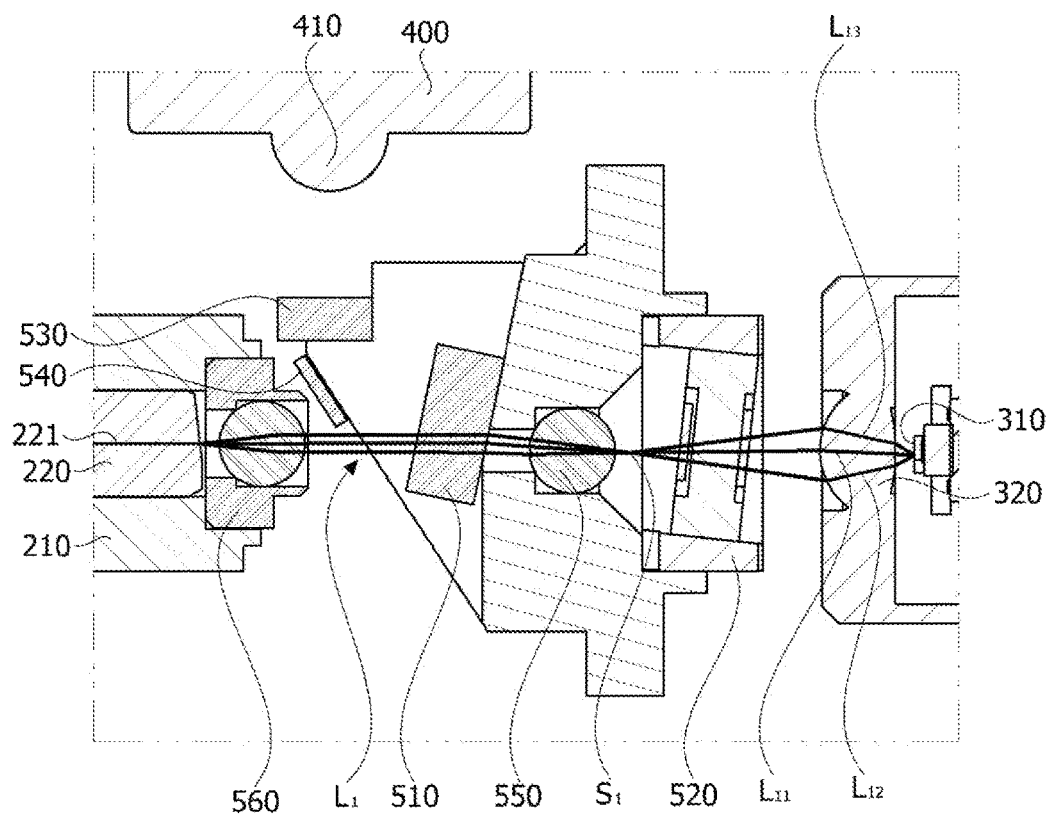
FIG. 6 is a view illustrating a movement path of a first optical signal output from an optical transmitter in an aspect of the present disclosure.

FIG. 6 is a view illustrating a movement path of a first optical signal that is output from an optical transmitter.

In FIG. 6, the first optical signal L1 that is output from the light source 310 includes main light L11 and emitted light L12 and L13. The main light L11 may be defined as light which propagates from the light source 310 to the optical fiber 221 along a main path (e.g., an optical axis), and the emitted light L12 and L13 may be defined as light which propagates at certain angles with respect to the main path.

The main light L11 and the emitted light L12 and L13 may be converged by the first focus lens 320 of the optical transmitter. A spot S1 at which the first optical signal L1 is converged may be between a first parallel light lens 550 and the isolator 520. The spot of convergence may be defined as a spot at which a plurality of such emitted light L12 and L13 become closer and focused.

Due to a configuration described above, in an aspect of the present disclosure, a cross-sectional beam area of light passing through the isolator 520 may become relatively smaller. The isolator 520 increases in cost as the size of a clear aperture increases. In the example, a position of the isolator 520 is disposed adjacent to the spot S1 at which the first optical signal L1 is converged to decrease the clear aperture of the isolator 520, thereby decreasing the cost of components.

The first parallel light lens 550 may convert the emitted light L12 and L13 into parallel light. That is, all the main light L11 and the emitted light L12 and L13 may be converted into the parallel light while passing through the first parallel light lens 550. In one implementation, the first parallel light lens 550 may be a collimator lens. Accordingly, since the first optical signal L1 passes through the first optical filter 510 having been converted into the parallel light, adequate light isolation may be provided even though wavelength separation is narrow.

The second parallel light lens 560 may focus the first optical signal L1 converted into the parallel light. That is, the second parallel light lens 560 may focus the first optical signal L1 and may convert the second optical signal L2 into the parallel light. The focused first optical signal L1 may be incident on the optical fiber 221 of the stub 220. Accordingly, the light coupling efficiency may be increased.

In an aspect of the present disclosure, since a WDM filter is used as the first optical filter and a first optical signal is converted into parallel light and incident on the first optical filter, a filter loss is small so that light coupling efficiency may be improved.

Also, in another aspect of the present disclosure, a lens disposed on the optical transmitter may be a general focus lens instead of a parallel light lens. A collimator optical system has excellent alignment tolerances with respect to X, Y, and Z axes and has a poor tolerance with respect to a tilting angle. Accordingly, since a very precise process is necessary when the collimator optical system is used, a manufacturing process may become complicated.

Figure 7:
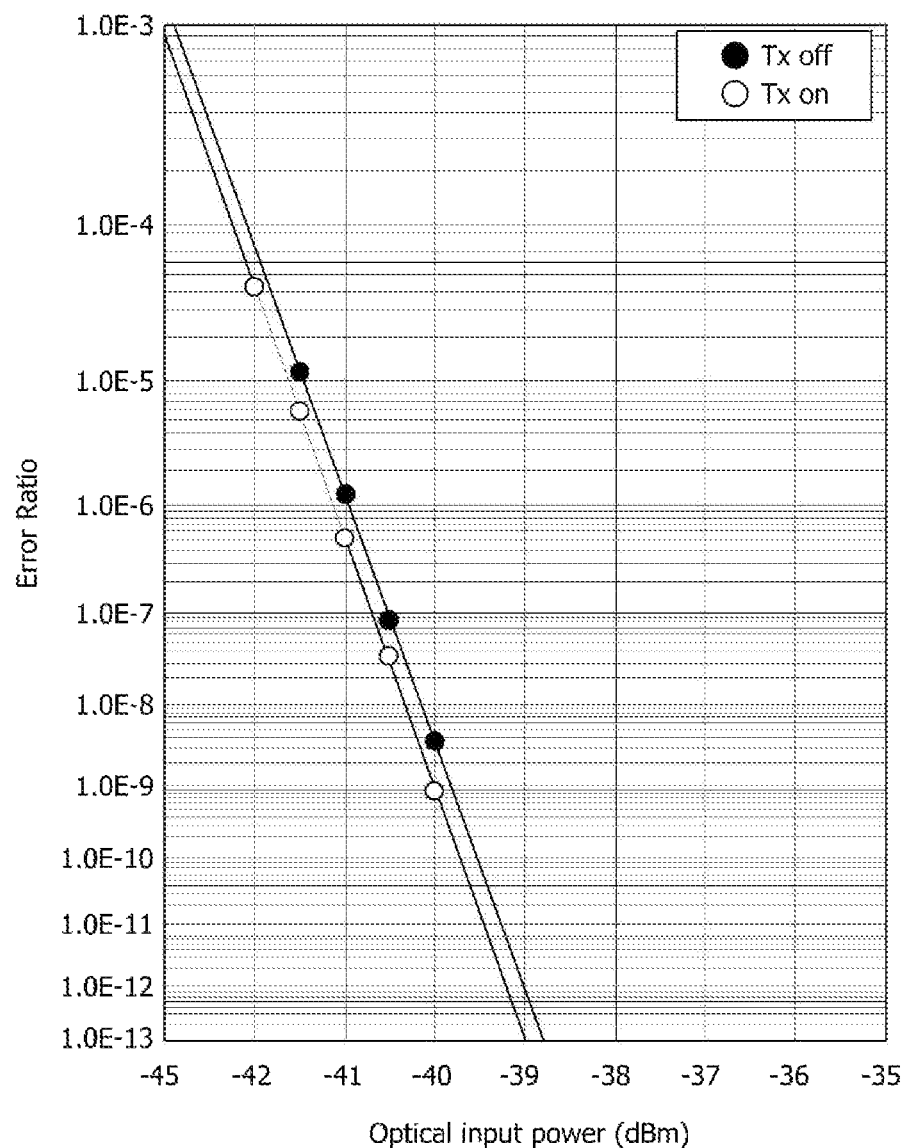
FIG. 7 is a graph illustrating bit error rates (BER) curves caused by turning-on and turning-off of the optical transmitter in an aspect of the present disclosure.

FIG. 7 is a graph illustrating bit error rate (BER) curves due to turning-on and turning-off of an optical transmitter.

FIG. 7 illustrates that a difference in reception sensitivity of the optical transmitter is about 0.5 dB when the turning-on signal and the turning-off signal of the optical transmitter are output. This may be thought of as most of the first optical signal that is output by the optical transmitter being output outward and thus not incident on the light receiving element due to noise.

That is, in an aspect of the present disclosure, it can be thought of as having the light crosstalk suppressed by effectively controlling light separation of a transmission signal and a reception signal with narrow wavelength separation by the first optical filter. Accordingly, the reception sensitivity of the light receiving element increases.

When a bidirectional optical module with a spacing between transmission and reception wavelengths is manufactured using an optical system like that of the embodiment, high light power, excellent receiving sensitivity, and low crosstalk properties may be provided to allow long distance transmission, and LD/PD TO-CAN with a general structure may be applied, thereby enabling manufacture of a product with productivity and a competitive price.

Figure 8:
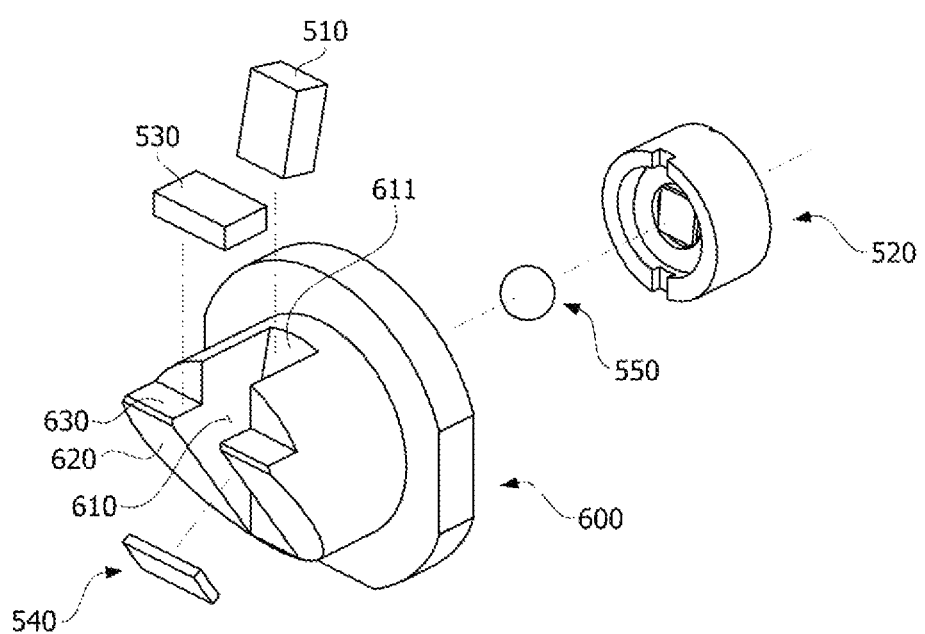
FIG. 8 is a view illustrating components of a supporting block in an aspect of the present disclosure.
Figure 9:
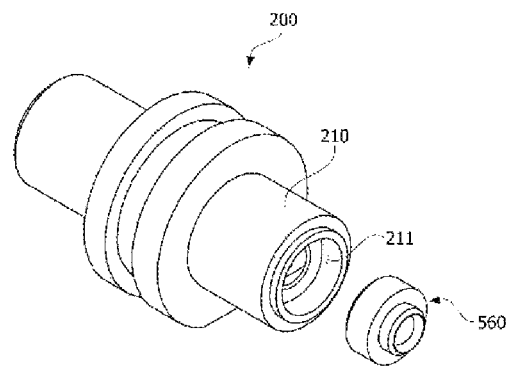
FIG. 9 is a view illustrating components of a holder in an aspect of the present disclosure.

FIG. 8 is a view illustrating components of the supporting block, for example, as shown in FIG. 1. FIG. 9 is a view illustrating components of the holder, for example, as shown in FIG. 1.

In FIG. 8, the supporting block 600 may accommodate the first parallel light lens 550, the first optical filter 510, the isolator 520, the reflector 540, and the second optical filter 530.

In an aspect of the present disclosure, since each of the components is disposed at a precise position only by inserting the holder 210 into the case 100 and the supporting block 600 into the case 100, reception sensitivity may increase.

By way of example, in the supporting block 600, a first accommodating groove 640 in which the first parallel light lens 550 is inserted and a second accommodating groove 650 in which the isolator 520 is disposed may be formed on one side. Also, the supporting block 600 may include an inclined plane 620 to which the reflector 540 is attached, a stepped portion 630 formed above the inclined plane 620 and on which the second optical filter 530 is disposed, and a groove 610 which penetrates the inclined plane 620. The first optical filter 510 may be disposed on an inclined portion 611 of the groove 610.

Referring to FIG. 9, the second parallel light lens 560 may be disposed in a groove 211 formed in front of the holder 210.

Figure 10:
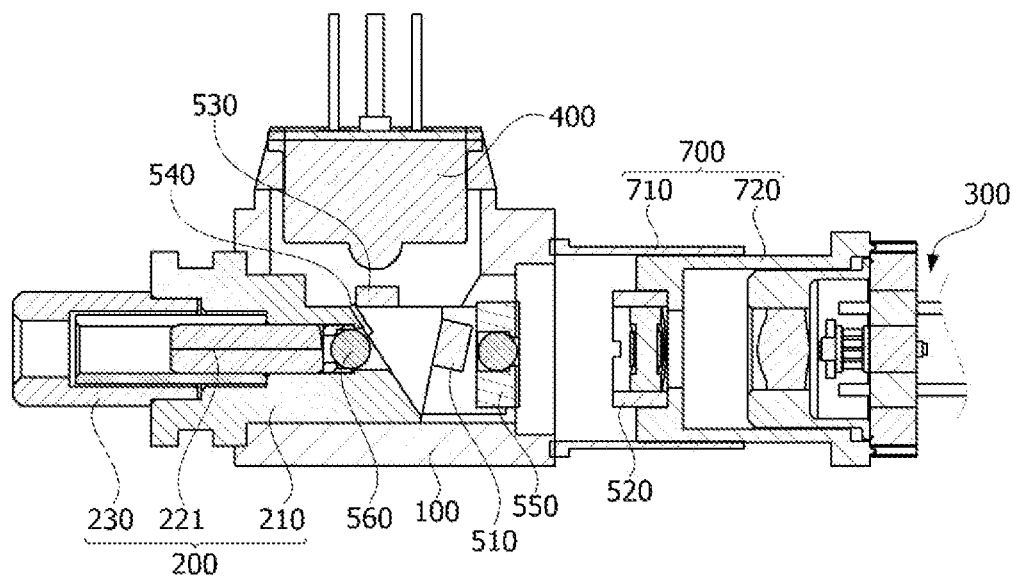
FIG. 10 is a view conceptually illustrating an optical module in an aspect of the present disclosure.
Figure 11:
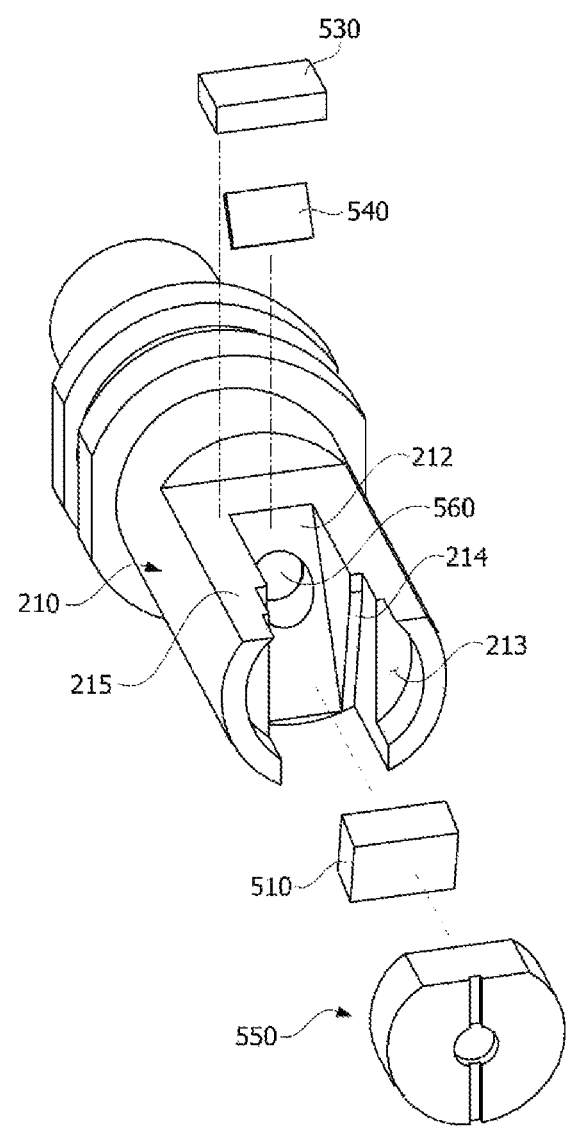
FIG. 11 is a view illustrating components of a holder shown in FIG. 10 in an aspect of the present disclosure.

FIG. 10 is a view diagram conceptually illustrating an optical module according to an aspect of the present disclosure. FIG. 11 is a view conceptually illustrating various components of a holder shown in FIG. 10.

Referring to FIGS. 10 and 11, the holder 210 may accommodate the first parallel light lens 550, the second parallel light lens 560, the first optical filter 510, the reflector 540, and the second optical filter 530. In a configuration described above, since all components are mounted in the holder 210 and may be disposed at precise positions only through mounting, the reception sensitivity may increase. Alternatively, the supporting block may be omitted.

The distance adjustment member 700 as shown in FIG. 10 may include the first adjustment member 710 coupled with the case 100 and the second adjustment member 720 inserted in the first adjustment member 710 and coupled with the optical transmitter 300. Here, the isolator 520 may be disposed inside of the second adjustment member 720.

Referring to FIG. 11, the holder 210 may include a first accommodating portion 213 in which the first parallel light lens 550 is accommodated, a second inclined portion 212 formed on a bottom surface of the first accommodating portion 213 and on which the reflector 540 is disposed, a protruding portion 214 formed on a sidewall of the second inclined portion 212 and on which the first optical filter 510 is disposed, and a top end flat portion 215 on which the second optical filter 530 is disposed.

According to various aspects of the present disclosure, a signal may be separated even when wavelength bands of a transmission signal and a reception signal are narrow. Further, in an aspect of the present disclosure, the light coupling efficiency between a transmission signal and an optical fiber may be increased. Furthermore, in another aspect of the present disclosure, the reception sensitivity of a photo diode may be increased and an optical crosstalk characteristic may be improved.

Various useful advantages and effects of the present disclosure are not limited to the above description and will be more easily understood through a description for detailed embodiments of the present disclosure.

The advantages and effects of the present disclosure may not be limited to the above, and they may be more easily understood by a skilled artisan in view of the detailed embodiments of the present disclosure. In the present disclosure, particular combinations of features are disclosed in the specification and/or recited in the claims, but these combinations are not intended to limit the disclosure of the present disclosure.

Further, the methods or methodologies for the present disclosure described therein may be implemented in any sequence. The term "unit" or "component" as used herein means software, hardware, or any combinations thereof. A unit may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combination thereof. The unit thus may include firmware, microcodes, circuits, data structures, tables, arrays and variables. Further, while for the purpose of simplicity, the methods and/or methodologies are described herein as a series of steps or acts, the claimed subject matter is to be understood as being not limited by the order of the steps or acts. Some steps or acts may occur in different orders and/or concurrently with other acts from that shown and described herein. Further, not all illustrated steps or acts may be required to implement various methodologies described herein.

Also, the methodologies disclosed herein and throughout the specification are capable of being stored on an article of manufacture to facilitate transporting and transferring such methodologies to one or more processing systems. The term "article of manufacture" is intended to encompass a computer program accessible from any computer-readable device, carrier, or medium.

In the present disclosure, as mentioned above, a singular form may include a plural form if there is no clearly opposite meaning in the context. Also, as used therein, the article "a" is intended to include one or more items. Further, no element, act, step, or instruction used in the present disclosure should be construed as critical or essential to the present disclosure unless explicitly described as such in the present disclosure. The terms "first," "second," and so forth used herein may also be used to describe various components, but the components are not limited by the above terms. The above terms are used only to discriminate one component from other components, without departing from the scope of the present disclosure. Also, the term "and/or" as used herein includes a combination of a plurality of items or any item of the plurality of the items. Further, when an element is described to be "coupled" or "connected" to another element, the element may be directly coupled or directly connected to the other element, or the element may be coupled or connected to the other element through a third element. Further, the term "include" or "have" as used herein indicates that a feature, an operation, a component, a step, a number, a part or any combination thereof described therein is present, and the above terms do not exclude a possibility of presence or addition of one or more other features, operations, components, steps, numbers, parts or combinations.

As noted herein, the present disclosure has been illustrated with specific examples described herein for the purpose of illustrations only, and thus one skilled in the art may appreciate that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical module comprising:
   an optical transmitter configured to output a first optical signal;
   an optical receiver configured to receive a second optical signal;

a holder including an optical fiber on which the first optical signal is incident and from which the second optical signal is emitted;

a first optical filter disposed between the optical transmitter and the holder to transmit the first optical signal and reflect the second optical signal;

a first parallel light lens disposed between the first optical filter and the optical transmitter;

a second parallel light lens disposed between the first optical filter and the holder;

a case into which the optical transmitter, the optical receiver, and the holder are inserted and in which the first optical filter, the first parallel light lens, and the second parallel light lens are disposed;

an isolator disposed between the first parallel light lens and the optical transmitter;

a reflector which is configured to reflect the second optical signal reflected by the first optical filter toward the optical receiver;

a second optical filter disposed between the reflector and the optical receiver; and an adjustment member which is configured to couple the optical transmitter to the case, wherein the holder is configured to accommodate the first parallel light lens, the second parallel light lens, the first optical filter, the reflector, and the second optical filter, and wherein the adjustment member comprises a first adjustment member coupled with the case and a second adjustment member inserted into the first adjustment member and coupled with the optical transmitter.

2. The optical module of claim 1, further comprising an isolator disposed between the first parallel light lens and the optical transmitter.

3. The optical module of claim 2, wherein the optical transmitter comprises a light source and a first focus lens which is configured to focus the first optical signal emitted from the light source.

4. The optical module of claim 3, wherein the first optical signal emitted from the light source is converged by the first focus lens and a spot at which the first optical signal is converged is between the first parallel light lens and the isolator.

5. The optical module of claim 4, wherein the first parallel light lens is configured to convert the first optical signal into parallel light, and the second parallel light lens is configured to focus the first optical signal that is converted into the parallel light.

6. The optical module of claim 1, wherein the second parallel light lens is configured to convert the second optical signal into parallel light.

7. The optical module of claim 6, further comprising a reflector which is configured to reflect the second optical signal reflected by the first optical filter toward the optical receiver.

8. The optical module of claim 7, further comprising a second optical filter disposed between the reflector and the optical receiver.

9. The optical module of claim 8, wherein the second optical signal that is converted into the parallel light is reflected by the first optical filter and the reflector, and the second optical signal that is reflected by the reflector passes through the second optical filter and is incident on the optical receiver.

10. The optical module of claim 1, further comprising a supporting block which is coupled with the case and is configured to accommodate the first parallel light lens, the first optical filter, the isolator, the reflector, and the second optical filter.

11. The optical module of claim 10, wherein the holder is configured to accommodate the second parallel light lens.

12. The optical module of claim 1, wherein the isolator is disposed inside of the second adjustment member.

* * * * *